United States Patent [19]

Hares et al.

[11] Patent Number: 4,683,168
[45] Date of Patent: Jul. 28, 1987

[54] METHOD OF PRODUCING A COMPOSITE BODY

[75] Inventors: George B. Hares; David L. Morse, both of Corning, N.Y.

[73] Assignee: Corning Glass Works, Corning, N.Y.

[21] Appl. No.: 830,276

[22] Filed: Feb. 18, 1986

Related U.S. Application Data

[63] Continuation-in-part of Ser. No. 690,172, Jan. 10, 1985, abandoned.

[51] Int. Cl.⁴ .................. B32B 17/06; B32B 17/10
[52] U.S. Cl. ................................. 428/335; 427/309;
428/336; 428/410; 428/422; 428/426; 428/432;
428/441; 428/442
[58] Field of Search ........... 428/422, 421, 200, 410,
428/212, 426, 432, 442, 441, 335, 336; 427/309,
226, 236; 148/6.16

[56] References Cited

U.S. PATENT DOCUMENTS

| | | | |
|---|---|---|---|
| 2,562,117 | 7/1951 | Osdal | 148/6.16 |
| 3,372,053 | 3/1968 | McCarthy | 427/236 |
| 3,522,075 | 7/1970 | Kiel | 427/226 |
| 3,837,895 | 9/1974 | Pryor et al. | 428/422 |
| 4,244,721 | 1/1981 | Gupta et al. | 427/309 X |
| 4,311,247 | 1/1982 | Dembicki et al. | 428/200 X |
| 4,337,295 | 6/1982 | Rittler | 428/410 |
| 4,421,878 | 12/1983 | Close | 428/422 X |

Primary Examiner—Thomas J. Herbert
Attorney, Agent, or Firm—C. S. Janes, Jr.

[57] ABSTRACT

A composite body consisting of a glass or glass-ceramic substrate with a non-stick, heat resistant resin composition bonded to a surface thereof. Suitable substrates are those which contain one or more differentially etchable components. Particularly useful are glass compositions which undergo phase separation upon heat treatment. For example, some borosilicate glasses separate into a silica-rich phase and a borate-rich phase when heated to about 600° C. and maintained at that temperature for about one hour. The substrate is etched to remove at least a portion of one component to provide a bonding surface containing extremely small pores of relatively uniform diameter for a non-stick heat resistant resin composition. The resin composition is uniformly applied to the etched substrate in liquid form and subsequently hardened, suitably by fusion, to form a solid, substantially continuous film over the etched surface.

10 Claims, 3 Drawing Figures

METHOD OF PRODUCING A COMPOSITE BODY

This application is a continuation-in-part application of Ser. No. 690,172, filed Jan. 10, 1985, now abandoned.

BACKGROUND AND PRIOR ART

The present invention relates to an improved method of applying and affixing polymeric compositions to relatively non-porous, hard, substrates, such as glass or glass ceramics, and to the composites produced by the method. More particularly, the present invention involves applying to a substrate having a closed, or heat polished, surface a heat resistant organic resin, which, after curing, provides the substrate with an anti-stick surface. The composites are particularly suited for a wide variety of cookware.

It is well known in the art to employ composites comprising a heat resistant low surface energy organic resin on the cooking surface of cookware. The resin forms a non-stick surface and substantially eliminates the need for cooking oils or fats since the cooked food has a substantially reduced tendency to adhere to the cooking surface. The absence of adhered residue on the cooking surface greatly reduces the time and effort needed to clean the utensil. The addition of fats is usually required only when desired for taste.

The heat resistant, polymeric compositions used in the prior art to coat cookware are aptly suited to use in the present invention. For example, the resin may be a polyamide; a polymer of a halogenated ethylene or a halogenated propylene; or a silicone. Polychlorotinfluoroethylene or mixtures containing preponderant amounts of polytetrafluoroethylene, such as mixtures of polytetrafluoroethylene with other polymerizable materials are particularly useful. When a copolymer is used, it preferably is a copolymer of polytetrafluoroethylene and ethylene. Useful copolymers generally contain at least about 60 percent by weight of polytetrafluoroethylene (PTFE), as well as organic resins operable as binders. A particularly useful polymeric composition consists substantially entirely of polytetrafluoroethylene.

Coatings, or films, of non-stick, heat resistant organic resins, such as polytetrafluoroethylene, are generally applied in a liquid form, usually as an aqueous dispersion. The coating on the substrate is hardened, or cured, generally by heating at, or above, the fusion temperature of the resin and maintaining such temperature for a period of from about ten to about twenty minutes. In the case of typical mixtures of polytetrafluoroethylene and binder resins, the curing temperature will generally be around 380° C. to 430° C. with curing times in the vicinity of about twenty minutes.

Although highly desirable, non-stock coatings on articles of glass or ceramic are produced only with difficulty and such articles have not been produced nearly to the extent of their potential demand. The heat resistant, organic resins which provide the desired non-stick surface do not possess a sufficient degree of adhesion to adhere to a substrate having a closed or relatively non-porous surface. This lack of adhesion results in failure of the coating. Various proposals have been made to remedy the problem. All are expensive and few have been commercially utilized. For example, scoring or grooving of the substrate surface improved bonding somewhat, but results in a weakened product. Sand or grit blasting of the substrate provides a roughened surface which also improves bonding somewhat, but not sufficiently for long term resistance to chemical and mechanical abuse. U.S. Pat. No. 2,562,117 teaches the use of a mixture of polytetrafluoroethylene and chromic acid to overcome the bonding problem. That practice leaves chromate residues which, being toxic, would not receive approval from the Federal Food and Drug Administration for use on articles which will come into contact with food. U.S. Pat. Nos. 3,837,895 and 3,372,053 teach the use of a preliminary layer of glass frit fused to the substrate to provide a bonding surface. U.S. Pat. No. 3,522,075 teaches the use of a preliminary layer of metal oxides deposited on the substrate surface to provide a bonding surface. U.S. Pat. No. 4,311,247 discloses means for sealing glass containers utilizing a membrane composed of an organic thermoplastic film. The process comprises first heating the glass container rim and then treating the rim portion with a thermally decomposable fluorine-containing compound, and thereafter the membrane is pressed against the rim at a temperature above the softening point of the thermoplastic material. British Pat. No. 1,360,222 describes means for improving the abrasion resistance of glass articles wherein the compositions thereof contain sodium ions. The method involves exposing the glass to copper halide vapors to replace sodium ions in the glass surface with copper ions and thereafter coating the surface of the glass with polyethylene, polyvinyl alcohol-carnauba wax, or a silicone resin. [Dutch Patent Application No. 7110549.] U.S. Pat. No. 4,337,295 discloses glasses containing borate-rich and silica-rich phases and observes that the borate-rich phase can be dissolved therefrom. However, there is no discussion to suggest the surface porosity parameters required in the present inventive products to insure strong, secure bonding of the resin to the glass or glass-ceramic substrate.

It is a principal objective of the present invention to provide a method for applying to glass or glass-ceramic substrates a non-stick, heat resistant resin which is bonded to such substrate.

It is a further objective of this invention to bond a non-stick, heat resistant resin on a substrate having a lack of natural adhesion or bonding. The resin is also suitable for use as a base or primer coat for the application of a succeeding layer or layers of the same or other materials.

It is a further objective to provide a composite comprising a base, or substrate, of glass or glass-ceramic having a surface layer of a bonded non-stick, heat resistant resin.

It is a further objective to produce a composite useful for the production of cooking utensils.

BRIEF DESCRIPTION OF THE INVENTION

In accordance with the present invention and to accomplish the objective thereof, there is provided a novel method for applying an adherent non-stick, heat resistant resin composition to a glass or glass-ceramic substrate having one or more differentially etchable components. The method comprises differentially etching the substrate surface to which the resin will be applied to remove at least a portion of one component from the substrate to provide a bonding surface having interconnecting pores with a depth of from about 500 to 4000 Angstroms, depending upon the material involved and the application to which the final product will be employed; said pores having relatively uniform diameters, viz., between about 50–30,000 Å (0.005–3 microns), and being relatively uniformly dispersed throughout the depth of the bonding surface. After etching, a non-stick, heat resistant resin composition is applied to the differentially etched surface. The resin composition is then heat cured to form a substantially continuous bonded layer on the surface.

The invention also comprehends a composite comprising a substrate of glass or glass-ceramic having one or more differentially etchable components, said substrate having an etched surface resulting from differential etching of the surface, and a non-stick, heat resistant resin bonded to the etched surface. The etched surface on the substrate extends to a depth of between about 500 and about 4000 Angstroms and consists of interconnected pores of relatively uniform diameters of between about 50–30,000 Å which are relatively homogeneously dispersed within the depth of the etched surface.

DETAILED DESCRIPTION OF THE INVENTION

Figure 1:
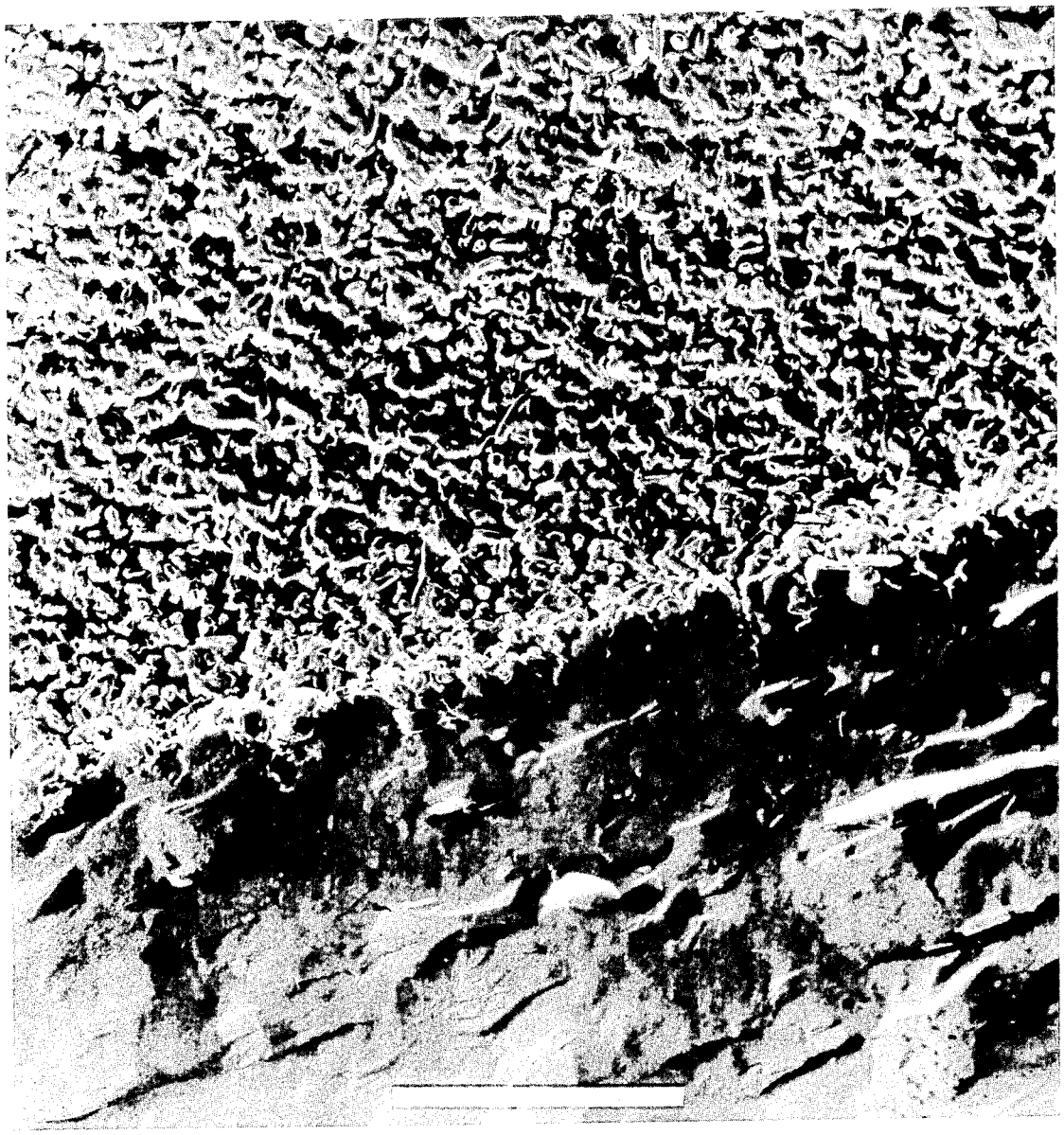
FIG. 1 constitutes a transmission electron micrograph comprising an over-the-edge replica comparing an etched surface with a fractured surface.

The present invention relates to a method of applying a non-stick, heat resistant resin composition to a glass or glass-ceramic substrate. Suitable substrates are those which contain one or more differentially etchable components. One embodiment of the invention contemplates the presence of glass compositions which demonstrate phase separation upon heat treatment. For example, some borosilicate glasses separate into two phases, viz., a silica-rich phase and a borate-rich phase, when heated to about 600° C. and maintained at that temperature for about one hour. The borate phase is preferentially removed when the substrate is subjected to an acid etch. This etching provides a highly microporous surface of uniformly-sized, interconnecting pores for bonding a non-stick heat resistant resin composition. The resin composition is uniformly applied to the etched substrate in liquid form and subsequently hardened, suitably by fusion, to form a solid, substantially continuous film tightly adhered to the etched surface.

The present invention also encompasses composites comprised of substrate materials, as described above, having one or more applications or non-stick, heat resistant resin composition successively layered over a differentially etched surface.

As observed above, operable substrates include phase separable glasses, such as borosilicate glasses, and more particularly alkali-borosilicates in which the silica-rich phase and the borate-rich phase have different solubilities. As used herein, the term "glass" includes a porcelain or enamel glass or glaze typically applied on metal substrates. Glass-ceramics are also useful substrates. Glass-ceramics typically consist of a myriad of relatively uniformly-sized, fine-grained crystals homogeneously dispersed throughout a residual glassy matrix. The solubility of the residual glass phase varies from the solubility of the crystallite phase.

As can be appreciated, the etched layer decreases in porosity with depth. The pores obtained by the differential etching process are typically cone shaped. Pore diameter and depth of the porous surface are generally greater in glass substrates. Electron micrographic examination of the differentially etched surfaces of particularly useful surfaces of both glasses and glass-ceramics shows a very uniform pore pattern over the entire treated surface.

It is of particular interest to contrast the structure of the surface obtained through the present method with that resulting from conventional surface preparation techniques such as grit blasting. For example, grit blasting with 80 grit alumina at a pressure of 100 lbs/in$^2$ produces a microscopically non-uniform surface with surface roughness from defects of about 1–20 microns in diameter and 1–10 microns in depth. This surface is not subject to adhesive interaction at the molecular level, but will increase adhesion only in direct relation to the small increase in surface area. Differential etching to develop a microporous surface results in pores of a size and of the same magnitude as the organic polymer molecules being adhered to the surface. Then, according to the well-accepted diffusion theory of adhesion, which theory is based upon the strong adhesion of materials which can diffuse into each other on a molecular scale, adhesion of dissimilar materials is vastly enhanced.

Because of that mechanism, it is apparent that the inventive process is applicable only with materials having differentially soluble phases. Such materials include glass-ceramics containing a glassy phase of molecular-sized dimension which is preferentially soluble with respect to the crystal phase, and phase separable glasses wherein one phase is preferentially soluble with respect to another, the soluble phase beng present in molecular size dimensions. Non-phase separable glasses, e.g., conventional soda lima glasses, will not take on a microporous surface when subjected to an etchant. Glass-ceramics wherein the average crystal size is quite large (>about 5 microns) are not operable in the present invention, because they do not yield a porous structure, upon etching, of a size scale small enough to insure a diffusion-type adhesive interaction.

The etchant is a solution which attacks one or more components, or phases, of glasses or glass-ceramics more readily than others. Etchants may suitably be selected from those generally known in the art, for example, those containing hydrofluoric acid as an active constituent. Particularly useful are solutions ranging from about 5 to 20, and more preferably from about 8 to 15, percent by weight of $NH_4F \cdot HF$ in an aqueous solution. The etchant is typically applied to the substrate as a liquid by spraying, brushing or dipping. The etchant is maintained in contact with the substrate for a time sufficient to obtain the desired etch. Generally, a static contact period at ambient temperatures of about 10 to 20 minutes using the above etchant strengths is sufficient. Longer contact periods or successive etching steps may be necessary to achieve the desired microporous surface. In a dynamic etchant environment such as a continuous flow spray or immersion in a stirred or otherwise agitated etchant solution, however, a shorter contact period, e.g., 2–5 minutes, may be sufficient. Furthermore, in those instances where an article has a highly siliceous surface layer or a glazed surface, such as may be present on a glass-ceramic, it may be convenient to remove that surface layer or glaze, as by sand-blasting, prior to etching. Such action is more rapid than etching the layer or glaze away.

The non-stick, heat resistant resin composition, preferably polytetrafluoroethylene (PTFE), is applied to the etched substrate usually in liquid form, normally a dispersion. Powders and solutions may, however, also be used. If required, the substrate is cleaned and dried prior to etching. The resin composition is applied by any suitable means, e.g., in case of a liquid, by spraying, brushing or dipping. Spraying is convenient and generally yields a substantially uniform coating.

The resin is formed into a substantially solid, continuous film by heating at or above the fusion temperature of the resin composition, typically about 410° C., for a period of about twenty minutes followed by cooling.

The amount of resin in the liquid, e.g., aqueous dispersion, may be varied depending upon the thickness of the lamina desired. Thus, a thin ply may be applied using about 10 percent by weight resin. Thicker laminae may contain up to 85-90 percent by weight resin. The mixing and smoothness of the layer are improved by the use of small amounts of suitable wetting agents. Other ingredients may be added to the resin composition provided they do not significantly adversely interfere with the coating operation, adhesion, heat resistance, or non-stick properties. For example, pigments, fillers, or solvents, which are useful in imparting color or to provide other useful properties to the lamina may be added.

The non-stick, heat resistant layer may advantageously be applied in a plurality of plies using an initial primer layer which will adhere better to the surface of the glass or glass-ceramic by having a lower percentage of PTFE, and subsequently applying an outer lamina consisting essentially of 100% PTFE for optimum non-stick performance.

The non-stick, heat resistant layer is typically dried at relatively low temperatures prior to curing in order to remove liquid solvent and alleviate bubbling problems which may occur at curing temperatures. A preferred drying temperature ranges from about 100° to about 220° C. for a time period from about three to about six minutes. If a plurality of plies are to be applied, the drying steps for each layer may be separately carried out and only a single hardening or curing step employed at the end.

The composites of the present invention comprise a substrate of glass or glass-ceramic, having an etched surface layer. The etched layer has one or more overlay laminae of a non-stick, heat resistant resin bonded thereon. It will be understood that in some cases the glass or glass-ceramic substrate may itself be a part of a composite wherein it is a layer positioned atop and bonded to another substrate such as a metal or enamel base. Such composites are useful as oven or bakeware, permitting the article to be used at high temperatures, including a full range of cooking and baking temperatures, with no impairment of the bonded resin surface.

Generally, the non-stick, heat resistant layer ranges in thickness from about 15 to 30 microns in thickness. Although lesser and greater thicknesses may be used, less than about 15 microns may not provide satisfactory wear resistance, and greater than about 30 microns does not provide additional benefits in relation to cost. The resin layer is commonly applied in two or more plies. In such cases, the initial, or primer, layer generally ranges from about 10 to 20 microns and the cover ply or plies generally range from about 10-20 microns.

The following examples are illustrative of the invention and are not to be considered as limiting. All parts and percentages are given by weight and all temperatures are given as degrees Celsius.

EXAMPLE I

The bonding strength of a non-stick, heat resistant resin was comparatively tested on the surface of 7740 PYREX ® glass (Pyrex is a registered trademark of Corning Glass Works, Corning, N.Y.). 7740 Pyrex glass has the following approximate composition:

$SiO_2$—81.0
$Al_2O_3$—2.0
$B_2O_3$ 13.0
$Na_2O$—4.0

The samples were heated to about 600° C. and maintained at that temperature for about one hour to obtain a phase separation of the glass composition.

In the first sample the surface of the glass was etched with an aqueous solution of 10 percent $NH_4F \cdot HF$ for fifteen minutes at room temperature, washed, and dried. The second sample was grit blasted using 80 grit alumina to provide a matted surface. The third sample was untreated.

A layer of polytetrafluoroethylene (Xylan ® resin 8333, a product of Whitford Corporation, West Chester, Pa.) was applied to each sample by air brush. The samples were then cured at 410° for about twenty minutes to provide each sample with a cured, fused, resin surface approximately 20 microns in thickness.

After cooling, several of the samples were tested using a cross hatch test standardly used for coatings such as paints. In this test a razor blade is used to inscribe a plurality of 2-5 mm squares on the sample to be tested. Thereafter, the sample is immersed into boiling water or a boiling water 5% by weight detergent solution for 15 minutes to 24 hours. Cellophane tape is then applied to the cross hatched area and peeled off. A measure of bonding is determined by the number of squares removed by the tape.

In the present tests, there was no removal of the resin from the etched glass, even upon repeated testing. In contrast, 50 percent of the resin surface was removed from the grit blasted glass, and 100 percent of the resin was removed from the untreated glass.

Other samples were subjected to a test termed the "low angle scribe". In that test two lines are cut into the surface utilizing a razor blade, the lines intersecting at about a 30° angle to yield a small point which has been cut from both sides. The samples were boiled in water or a water 5% by weight detergent solution and then tested with cellophane tape.

Still other samples were subjected to a test wherein a line is scribed by a razor blade held at 45° to the surface and, after boiling the sample, removal of the resin is attempted with a thumbnail or a stiff metal spatula.

No removal of the PTFE on the etched samples was observed in either of the above tests, whereas both the grit blasted and the untreated samples failed each test.

EXAMPLE II

Samples of a glass-ceramic marketed by Corning Glass Works, Corning, New York under the trademark CORNING WARE ® and containing $\beta$-spodumene solid solution as the predominant crystal phase were exposed to the same etching procedure as outlined above in Example 1. That is, the samples were simply immersed into an aqueous solution of 10% by weight $NH_4F \cdot HF$ for 15 minutes at ambient temperature; thereafter washed and dried. An approximate analysis of the glass-ceramic is given below, expressed in weight percent on the oxide basis:

$SiO_2$—69.6
ZnO—1.0
$TiO_2$—4.7
MgO—2.7
$Na_2O$—0.4
$Li_2O$—2.7
ZnO—0.3
$As_2O_3$—0.8
$Al_2O_3$—17.6

Upon contact of the samples with $NH_4F.HF$, the residual glass is etched away. Because the average particle size of the beta-spodumene solid solution crystals is <2 microns, a desirably fine microporous surface structure of uniform character is formed on the sample.

FIG. 1 constitutes a transmission electron micrograph illustrating the uniform character of the porous surface. The micrograph comprises an over-the-edge replica comparing an etched surface (top portion of FIG. 1) with a fractured surface. The white bar at the base of the micrograph represents a distance of 1 micron.

As is readily observed from the micrograph, the etched region presents a relatively uniformly fine porous area characterized by pores having diameters of about 500 Å (0.05 micron) and having a maximum depth of about 600 Å, as evidenced at the intersection of the etched and fractured surfaces.

Thereafter, Xylan ® resin 8333 was applied to those samples and cured in like manner to the description above in Example 1 to yield a layer having a thickness of about 20 microns.

Those samples, along with samples which had been grit blasted prior to the application of Xylan ® resin 8333 and samples which had received no surface treatment prior to the application of the resin, were subjected to the cross hatch test described above. No removal of the PTFE from the etched samples was observed, whereas about 50% of the resin surface was removed from the grit blasted samples and 100% was removed from the untreated samples.

Three other sets of samples (etched, grit blasted, and no treatment before application of PTFE) were subjected to the cross hatch test after being immersed in boiling water for 24 hours. No removal of the PTFE was noted in the etched samples, whereas about 60–70% was removed from the grit blasted samples and the resin surface was totally removed from the untreated samples.

EXAMPLE III

A glass-ceramic body was formed from a precursor glass base composition of Example 2, but wherein the precursor glass was heat treated in a manner to yield a transparent final product containing a very fine-grained crystals of β-quartz solid solution as the predominant crystal phase. The surface of the glass-ceramic was etched with the aqueous solution of 10% $NH_4F.HF$ for 15 minutes at room temperature and then washed and dried. Three plies of PTFE were applied consisting of a primer, a midcoat, and a top coat (Xylan ® resins 8231, 8231, and 8233, respectively) utilizing a drying step of 200° C. for 10 minutes after application of the primer coat, and a curing step of 400° C. for 10 minutes after the application of the midcoat and again after application of the top coat.

After cooling, the samples were separated into two groups. The first group was tested immediately employing the standard cross hatch test described above. The second group was placed in a commercial dishwasher and subjected to a simulation of two years of dishwasher cycles. Thereafter, the second group was tested in accordance with the cross hatch procedure. No loss of surface resin was observed in either group of samples.

Figure 2:
FIG. 2 consists of a scanning electron micrograph illustrating the surface porosity obtained through grit blasting the surface.
Figure 3:
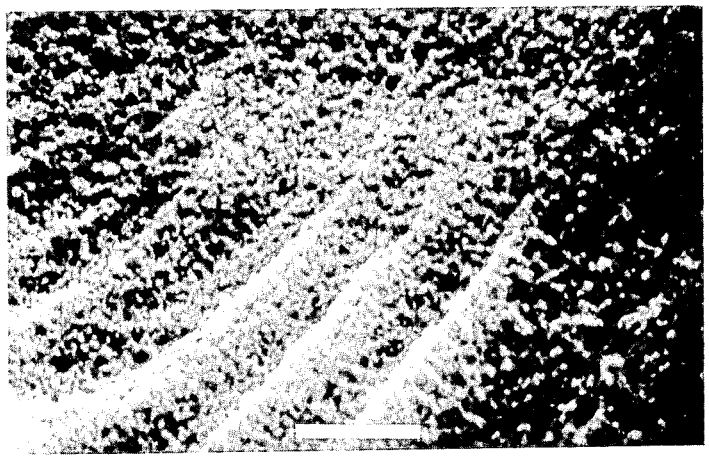
FIG. 3 presents a scanning electron micrograph illustrating the surface porosity resulting from etching the surface.

FIGS. 2 and 3 are scanning electron micrographs derived from samples of Example III which serve to pictorially explain the mechanism underlying the present invention. The white bar at the bottom of FIG. 2 represents a distance of 10 microns and the white bar at the bottom of FIG. 3 represents a length of 1 micron.

FIG. 2 illustrates the surface porosity obtained through grit blasting the surface of the glass-ceramic and FIG. 3 depicts the surface porosity resulting from etching the surface of the glass-ceramic. Even the most cursory inspection of the micrographs reveals significant differences in the surface character of the two specimens. Thus, the pores of the grit blasted surface pictured in FIG. 2 are quite coarse and vary greatly in size and shape, generally with diameters in excess of five microns. In contrast, the pores present in the etched surface exhibited in FIG. 3 can be seen to be very small (~0.5–1 micron [5000–10,000 Å] in diameter) and remarkably uniform in size and shape such as to promote adhesive interaction at the molecular level.

It will be apparent that many embodiments of the present invention may be made without departing from the spirit and scope thereof; and therefore the present invention is not intended to be limited except as indicated in the following claims.

What is claimed is:

1. A composite comprising:
   (a) a substrate of glass or glass-ceramic having one or more differentially etchable components, the crystals of said glass-ceramic having an average size less than about 5 microns, and said substrate having an etched surface resulting from the differential etching of said surface; the etched surface on said substrate extending to a depth of between about 500–4000 Å with interconnected pores of relatively uniform diameters of about 50–30,000Å relatively homogeneously dispersed throughout the etched surface; and
   (b) a non-stick, heat resistant resin bonded to said etched surface through diffusion-type adhesive interaction on a molecular scale, said resin having a thickness of at least about 15 microns.

2. The composite of claim 1 wherein the non-stick, heat resistant resin ranges from about 15 to 30 microns in thickness.

3. The composite of claim 1 wherein the substrate is a glass-ceramic with pores of relatively uniform diameters of about 0.05–1 micron.

4. The composite of claim 1 wherein the non-stick, heat resistant resin is fused.

5. The composite of claim 1 wherein the substrate is a phase separable glass.

6. The composite of claim 5 wherein the substrate is a borosilicate glass.

7. The composite of claim 1 wherein the non-stick, heat resistant resin coating contains a preponderant amount of polytetrafluorethylene.

8. The composite of claim 7 wherein the coating is substantially entirely polytetrafluoroethylene.

9. The composite of claim 1 wherein said substrate is bonded to a metal base.

10. The composite of claim 9 wherein the substrate is phase separable glass.

* * * * *